United States Patent
Pallam et al.

(10) Patent No.: US 11,316,344 B2
(45) Date of Patent: *Apr. 26, 2022

(54) CAPACITY ESTIMATOR FOR AN ENERGY GENERATION AND/OR STORAGE SYSTEM

(71) Applicant: Enphase Energy, Inc., Petaluma, CA (US)

(72) Inventors: Ayyapu Reddy Pallam, Bangalore (IN); Sandeep Chandran, Telangana (IN); Rishabh Goel, Haryana (IN); Samuel Mattathil Joseph, Karnataka (IN); Sumit Saraogi, Freemont, CA (US); Ashish Bansal, Karnataka (IN); Jayant Somani, Saratoga, CA (US); Badrinarayanan Kothandaraman, Fremont, CA (US); Ankit Prakash Gupta, Bangalore (IN); Jan Spencer Rosen, Vista, CA (US)

(73) Assignee: Enphase Energy, Inc., Petaluma, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/525,306

(22) Filed: Nov. 12, 2021

(65) Prior Publication Data

US 2022/0085606 A1   Mar. 17, 2022

Related U.S. Application Data

(63) Continuation of application No. 17/351,470, filed on Jun. 18, 2021.
(Continued)

(51) Int. Cl.
*H02J 3/00* (2006.01)
*H02S 50/10* (2014.01)
(Continued)

(52) U.S. Cl.
CPC ............... *H02J 3/004* (2020.01); *G01J 1/18* (2013.01); *H02S 40/32* (2014.12); *H02S 50/10* (2014.12);
(Continued)

(58) Field of Classification Search
CPC ....... H02J 3/004; H02J 2300/24; H02S 40/32; H02S 50/10; G01J 1/18; F24S 2201/00
(Continued)

(56) References Cited

U.S. PATENT DOCUMENTS

| | | |
|---|---|---|
| 7,512,540 B2 | 3/2009 | Gluck et al. |
| 7,844,499 B2 | 11/2010 | Otomo et al. |

(Continued)

FOREIGN PATENT DOCUMENTS

| | | |
|---|---|---|
| WO | WO-0223425 A1 | 3/2002 |
| WO | WO-2004094328 A1 | 11/2004 |

OTHER PUBLICATIONS

"Calculate how many solar panels you need for your home", SolarReviews, dated Sep. 1, 2021 [https://www.solar-estimate.org/solar-panels-101/how-many-square-feet-of-roof-space-do-i-need-to-install-solar-panels].

(Continued)

*Primary Examiner* — Hal Kaplan
(74) *Attorney, Agent, or Firm* — Moser Taboada

(57) ABSTRACT

A method and apparatus for estimating capacity of a system including an energy generation system, an energy storage system or both. The method and apparatus initially estimate the system capacity based on a facility location and size. The initial estimate may be adjusted through adjustment of at least one parameter. An updated capacity estimate is generated and displayed.

19 Claims, 17 Drawing Sheets

Related U.S. Application Data

(60) Provisional application No. 63/084,827, filed on Sep. 29, 2020, provisional application No. 63/041,102, filed on Jun. 18, 2020.

(51) Int. Cl.
*H02S 40/32* (2014.01)
*G01J 1/18* (2006.01)

(52) U.S. Cl.
CPC ....... *F24S 2201/00* (2018.05); *H02J 2300/24* (2020.01)

(58) Field of Classification Search
USPC .......................................... 702/61
See application file for complete search history.

(56) References Cited

U.S. PATENT DOCUMENTS

| | | |
|---|---|---|
| 9,279,602 B2 | 3/2016 | Birch et al. |
| 2011/0204720 A1 | 8/2011 | Ruiz et al. |
| 2011/0307109 A1 | 12/2011 | Sri-Jayantha |
| 2013/0030784 A1 | 1/2013 | Viassolo et al. |
| 2013/0074513 A1 | 3/2013 | Mueller |
| 2014/0025343 A1 | 1/2014 | Gregg et al. |
| 2015/0066442 A1 | 3/2015 | Pryor |
| 2015/0244170 A1 | 8/2015 | Bartlett et al. |
| 2016/0063413 A1 | 3/2016 | Keast et al. |
| 2016/0187910 A1 | 6/2016 | Moreno |
| 2016/0218505 A1 | 7/2016 | Ahmed et al. |
| 2021/0399547 A1* | 12/2021 | Pallam .................... H02S 40/32 |

OTHER PUBLICATIONS

WAAREE, "Solar Calculator", [https://www.waaree.com/calculator].

"Solar Rooftop Calculator", ENVIRAJ Consulting Online Tools [https://enviraj.com/online-tools/solar-rooftop-calculator.html].

"Solar Rooftop Calculator", SPIN—An online portal for Solar Photovoltaic Installation (Grid-Connected Rooftop), Ministry of New and Renewable Energy (Government of India), [https://solarrooftop.gov.in/rooftop_calculator].

PCT International Search Report and Written Opinion for Application No. PCT/US2021/038053 dated Oct. 13, 2021, 10 pgs.

"Solar Rooftop Calculator", downloaded from: https://solarrooftop.gov.in/rooftop_calculator on Feb. 10, 2022, 3 pgs.

* cited by examiner

FIG. 11

CAPACITY ESTIMATOR FOR AN ENERGY GENERATION AND/OR STORAGE SYSTEM

RELATED APPLICATIONS

This application is a continuation application of U.S. patent application Ser. No. 17/351,470, filed on Jun. 18, 2021, which claims benefit to U.S. Provisional Patent Application Ser. No. 63/041,102, filed 18 Jun. 2020 and entitled "Capacity Estimator For An Energy Generation and/or Storage System," and U.S. Provisional Patent Application Ser. No. 63/084,827, filed 29 Sep. 2020 and entitled "Capacity Estimator For An Energy Generation and/or Storage System," which are both hereby incorporated by reference herein in their entireties.

BACKGROUND

Field

Embodiments of the present invention generally relate to energy generation and/or storage systems and, in particular, to a capacity estimator for such systems.

Description of the Related Art

A solar energy generation and storage system typically comprises a plurality of solar panels, one or more power inverters, a storage element and a service panel. The solar panels are arranged in an array and positioned to maximize solar exposure. Each solar panel or small groups of panels may be coupled to an inverter (so-called micro-inverters) or all the solar panels may be coupled to a single inverter. The inverter(s) convert the DC power produced by the solar panels into AC power. The AC power is coupled to the service panel for use by a facility (e.g., home or business), supplied to the power grid, and/or coupled to a storage element such that energy produced at one time is stored for use at a later time. Other energy generators having flexible capacity that is defined at installation include wind turbines arranged on a so-called wind farm. Storage elements may be one or more of batteries, fly wheels, hot fluid tank, hydrogen storage or the like. The most common storage element is a battery pack (i.e., a plurality of battery cells) having a bidirectional inverter coupled to the service panel to supply the batteries with DC power as well as allow the batteries to discharge through the inverter to supply AC power to the facility when needed.

Prospective purchasers of a solar energy generation and storage systems typically begin the process by meeting with a system installer and having the installer perform a site survey. The installer manually estimates the capacity of the required system by visiting the site where the installation is planned, measuring the space available, determining the amount of sunshine available based on the direction the solar panels will be exposed to the sun, estimating the capacity of the solar power generation available, and estimating the amount of energy storage that is commensurate with the amount of energy to be generated. Such meetings and surveys are time consuming and form an inefficient use of the purchaser's and installer's time. Especially when the prospective purchaser is merely exploring the possibility of making a purchase.

In some instances, a system may comprise only solar or only storage (i.e., storage in lieu of using a fossil fuel powered power generator during a black out). The process for estimating only solar system requirements or only storage system requirements is substantially similar to the inefficient process described above for estimating a solar and storage systems.

Therefore, there is a need for an efficient, automated energy generation and/or storage system capacity estimator.

BRIEF DESCRIPTION OF THE DRAWINGS

So that the manner in which the above recited features of the present invention can be understood in detail, a particular description of the invention, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 8, 9, 10, 11, 12, 13, 14, 15, 16 and 17 depict web pages used as a data input interface to the capacity estimator method of FIGS. 3A, 3B, and 3C and used for information display of capacity requirements in accordance with another embodiment of the invention.

DETAILED DESCRIPTION

Embodiments of the present invention comprise apparatus and methods for estimating capacity for energy generation and/or energy storage systems. Embodiments of the invention utilize a web page as an interface to a user. The web page facilitates data input such as, one or more of, facility size (e.g., home size), facility location (e.g., zip code), electrical load information, electrical panel information, load utilization information, family size and/or the like. In an embodiment for capacity estimation of a solar energy generation system, from the size and location information, a capacity estimator determines the amount of sunlight that is typically available at the particular location. From the facility size, a roof area estimate is determined. Using the available roof area and the amount of sunlight, the estimator determines a model of an energy generation and storage system including, for example, a solar array size (i.e., an estimate of a number of panels and amount of energy generation available for that particular facility) and the amount of storage required for the facility size and available solar energy. The user may adjust a number of parameters that form at least a portion of the model to fit their requirements including, but not limited to: facility size, number of solar panels, amount of storage, types of electrical loads, amount of energy needed during a power outage, daily energy consumption, and the like. With every change in a parameter, the capacity estimator updates and displays a required energy generation and storage capacity via the web page. The user may also select to estimate only storage or only solar generation capacity. Additionally, the capacity estimator may generate a bill of materials (BOM) listing the components of the modeled system, create financial estimates regarding purchase and installation of a system, optimize the energy generation system in view of the storage system or vice versa, and/or the like.

Figure 1:
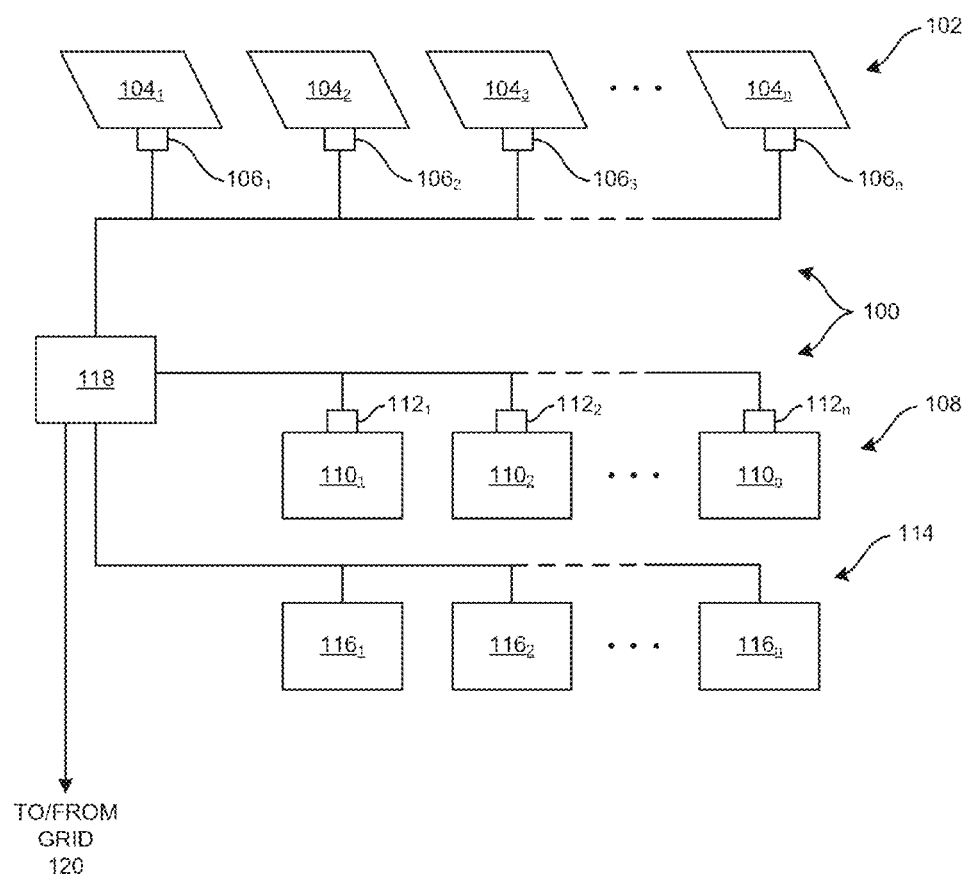
FIG. 1 depicts a block diagram of energy generation and storage system having a capacity that is to be estimated in accordance with at least one embodiment of the invention.

FIG. 1 depicts a block diagram of solar energy generation and storage system 100 having a capacity that is to be estimated in accordance with at least one embodiment of the invention. The system 100 comprises a plurality of distributed generator 102 (e.g., solar panels $104_1$, $104_2$, $104_3$, . . . $104_n$ coupled to inverters $106_1$, $106_2$, $106_3$, . . . $106_n$), storage 108 (e.g., batteries $110_1$, $110_2$, . . . $110_n$ coupled to bidirectional inverters $112_1$, $112_2$, . . . $112_n$), and a service panel 118 through which the distributed generator 102 is coupled to the storage 108. The service panel 118 is also coupled to a plurality of loads 114 represented by loads $116_1$, $116_2$, . . . $116_n$. The loads 114, in a residential application, may comprise washer, dryer, refrigerator, air conditioner, hot water heater, electric car, and/or any other electricity consuming device in the household. The loads 114, in an industrial application, may comprise electric motors, heating systems, air conditioning systems, refrigerators, freezers, and/or any other electricity consuming device generally used in an industrial setting. The service panel 118 may also be coupled to the power grid 120, such that, energy may be consumed from the grid 120 or sourced to the grid 120, as necessary. As shall be described below, embodiments of the present invention facilitate estimating the capacity necessary for the distributed generators 102 and/or storage 108 to power the loads 114.

Figure 2:
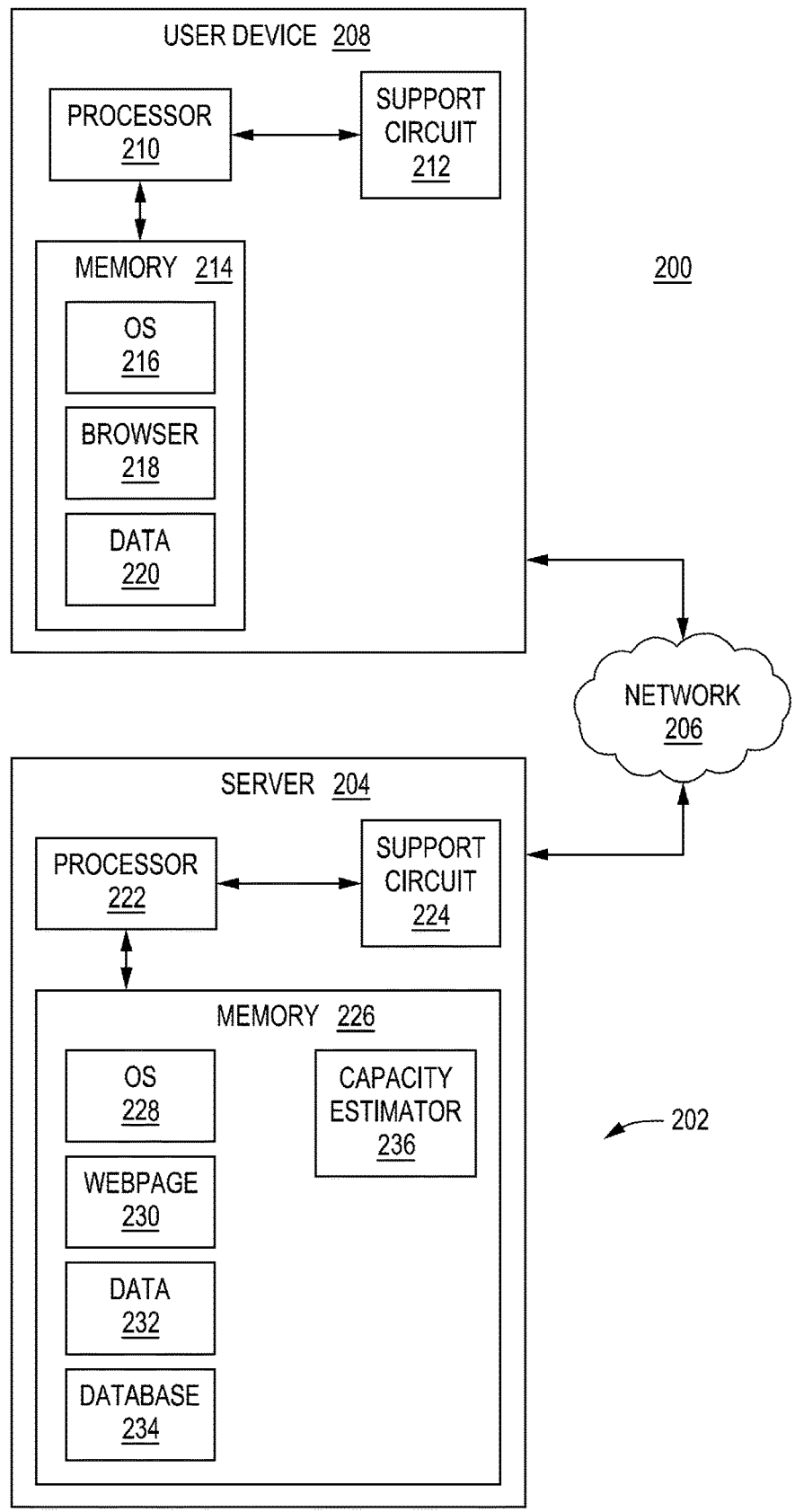
FIG. 2 depicts a block diagram of a computer system supporting an energy generation and/or storage capacity estimator in accordance with an embodiment of the invention.

Although FIG. 1 depicts a distributed generator 102 having a single solar panel coupled to a single inverter (i.e., micro-inverter), this depiction is not meant to limit the scope of the invention. For example, embodiments of the invention may also be used with distributed generators having a plurality or more solar panels coupled to one or more inventers. Furthermore, distributed generators may include other forms of energy generation such as wind turbines arranged on a so-called "wind farm." Similarly, energy storage in a battery-based storage system is described as an example of the type of storage whose capacity is estimated using embodiments of the invention; however, other forms of energy storage may be used such as fly wheel(s), hot fluid tank(s), hydrogen storage system(s), pressurized gas storage system(s), pumped storage hydropower, fuel cells, or the like FIG. 2 depicts a block diagram of a computer system 200 supporting an energy generation and/or storage capacity estimator 202 in accordance with an embodiment of the invention. The computer system 200 comprises a server 204, a computer network 206 (e.g., Internet) and at least one user device 208 (e.g., mobile phone, digital assistant, computer, or any other device capable of displaying a web page). In operation, the user device 208 accesses a web page from the server 204 and displays the web page for user interaction. The server 204, when executing specific software, enables the general-purposes server to operate as a specific-purpose device. Specifically, the server operates as a capacity estimator 202 to determine capacity information to display to a user on the user device in response to user data entered into fields on the web page.

The user device 208 comprises at least one processor 210, support circuits 212 and memory 214. The at least one processor 210 may be any form of processor or combination of processors including, but not limited to, central processing units, microprocessors, microcontrollers, field programmable gate arrays, graphics processing units, and the like. The support circuits 212 may comprise well-known circuits and devices facilitating functionality of the processor(s). The support circuits 212 may comprise one or more of, or a combination of, power supplies, clock circuits, communications circuits, cache, and/or the like.

The memory 214 comprises one or more forms of non-transitory computer readable media including one or more of, or any combination of, read-only memory or random-access memory. The memory 214 stores software and data including, for example, an operating system (OS) 216, a browser 218, and data 210. The operating system 216 may be any form of operating system such as, for example, Apple iOS, Microsoft Windows, Apple macOS, Linux, Android or the like. The browser 218 may be any software that, when executed by the processor(s) 210, is capable of displaying and enabling user interaction with a web page. Such browsers 218 include, but are not limited to, Explorer, Safari, Chrome, Edge, Firefox or the like. The data 220 may include a web page, or portion thereof, data used by a web page, data entered by a user into fields within a web page and/or any other data used by the browser 218 to display and facilitate use interaction with a web page.

The server 204 comprises at least one processor 222, support circuits 224 and memory 226. The at least one processor 222 may be any form of processor or combination of processors including, but not limited to, central processing units, microprocessors, microcontrollers, field programmable gate arrays, graphics processing units, and the like. The support circuits 224 may comprise well-known circuits and devices facilitating functionality of the processor(s). The support circuits 224 comprise one or more of, or a combination of, power supplies, clock circuits, communications circuits, cache, and/or the like.

The memory 226 comprises one or more non-transitory computer readable media including one or more of, or any combination of, read-only memory or random-access memory. The memory 226 stores software and data including, for example, an operating system (OS) 228, a web page 230, data 232, a database 234 and capacity estimator software 236. The operating system 228 may be any form of operating system such as, for example, Apple iOS, Microsoft Windows, Apple macOS, Linux, Android or the like. The web page 230 is a web page that is accessible to the browser 218 of the at least one user device 208 to facilitate use of the capacity estimator 202 as shall be described in detail with respect to FIGS. 3 through 6 below. The data 220 may include data entered by a user into fields within a web page and/or any other data used by the server 204 to facilitate use of the web page. The database 234 contains data to facilitate determinations made by the capacity estimator software 236. This data may include, but is not limited to, amount of sunshine corresponding to a location, amount of energy generated by specific numbers of solar panels, amount of energy capable of storage by specific storage devices, and the like. The database 234 may be locally stored at the server 204 or may be remotely stored on another server or servers and accessed via the network 206.

The server 204, when executing the capacity estimator software 236, is transformed from a general-purpose device into a specific-purpose device. i.e., transformed into the capacity estimator 202. The capacity estimator software 236, when executed, enables at least one user device 208 to access and interact with the web page 230. The access and interaction shall be described with respect to FIGS. 3A, 3B and 3C.

The computer system 200 may operate in conjunction with a communications manager as described in commonly assigned U.S. patent application Ser. No. 17/345,547, filed 11 Jun. 2021, entitled "Method and Apparatus for Communicating Information Regarding Distributed Generator Systems," which is hereby incorporated by reference herein in its entirety. The communications manager facilitates communications amongst stakeholders (e.g., consumers, installers, vendors, etc.) involved in the design, development, purchase, installation, monitoring and maintenance of a distributed energy generation system.

Figure 3A:
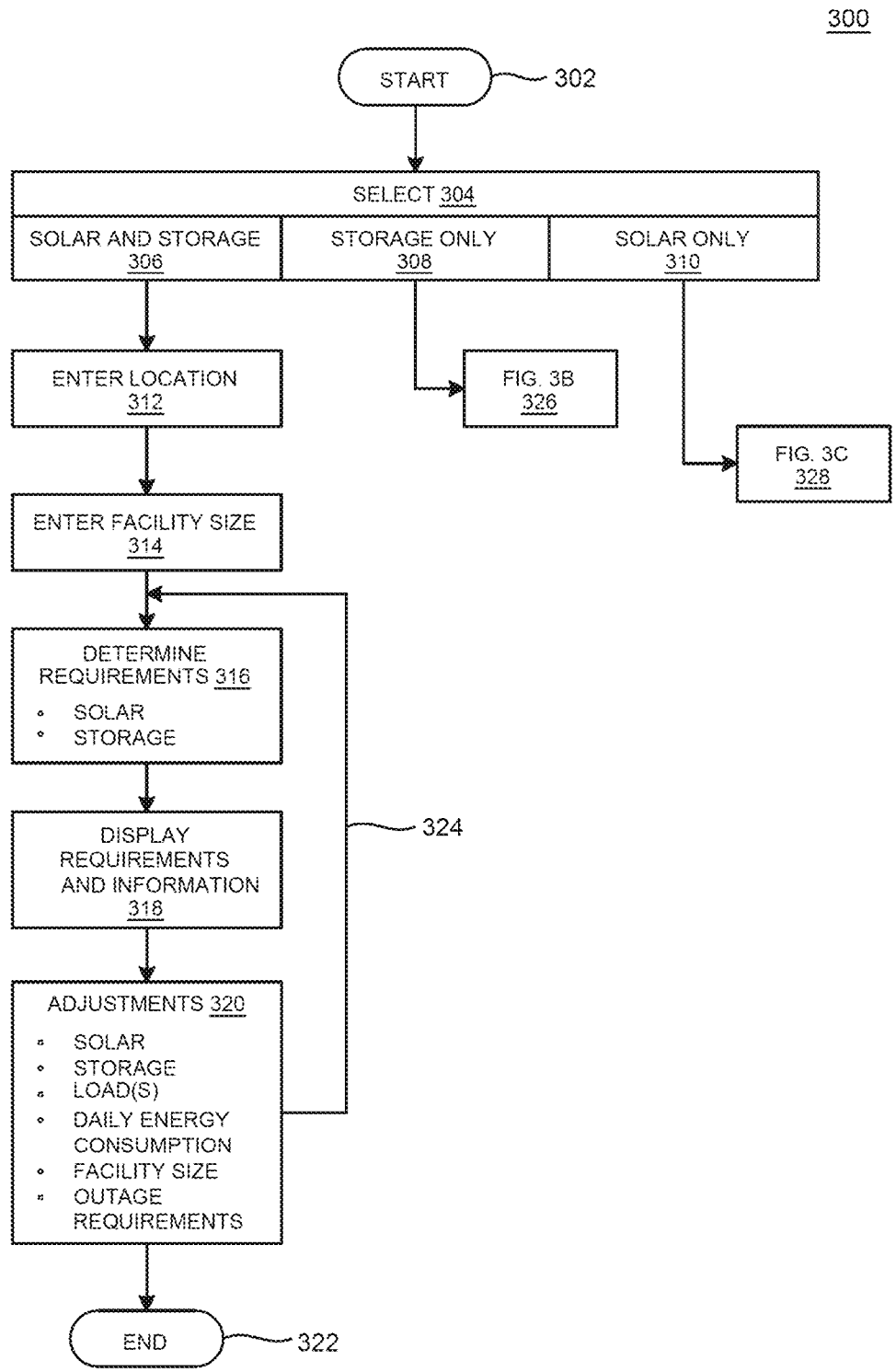
FIGS. 3A, 3B and 3C together depict a flow diagram of a capacity estimator method for an energy generation and/or storage system in accordance with at least one embodiment of the invention.
Figure 3B:
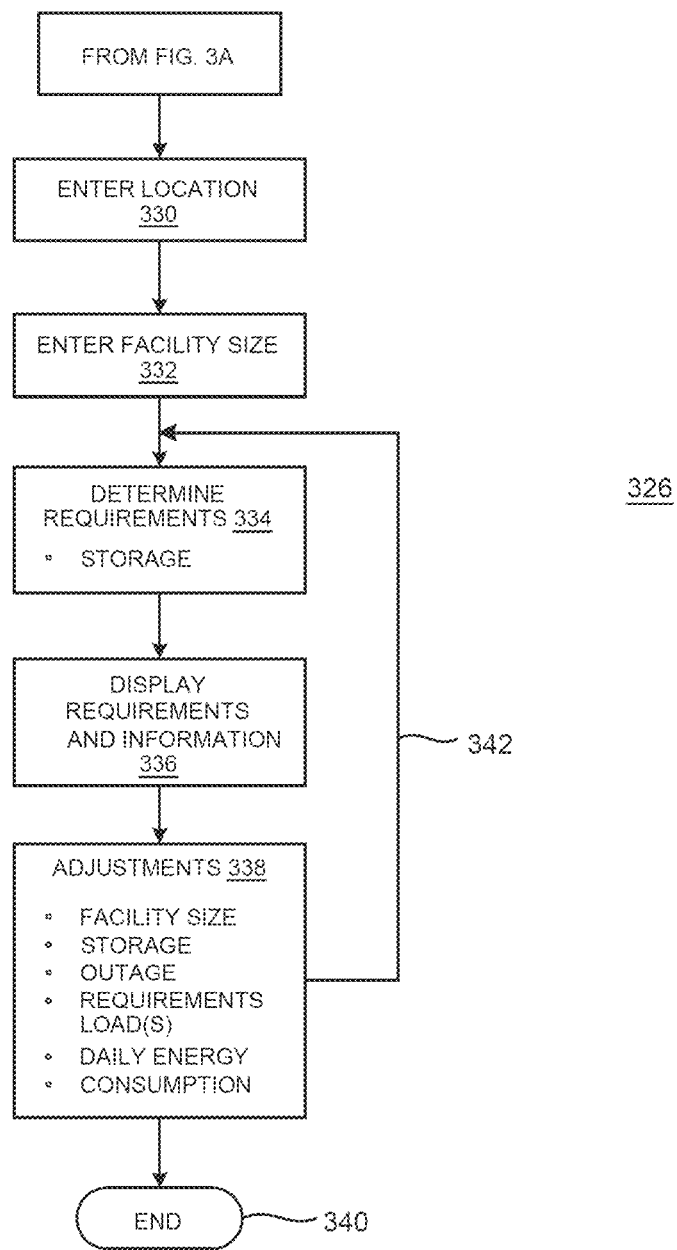
Figure 3C:
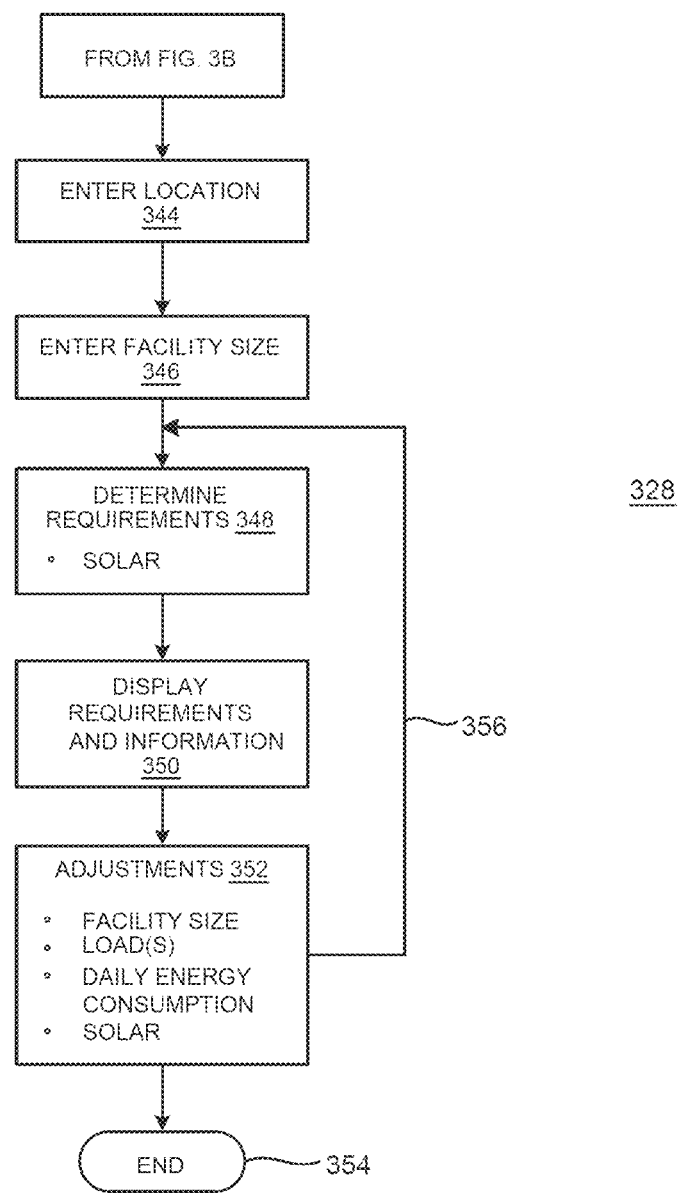

FIGS. 3A, 3B and 3C together depict a flow diagram of a capacity estimator (202 of FIG. 2) for a solar energy generation and/or storage system (100 of FIG. 1) in accordance with an embodiment of the invention. As mentioned above, using the capacity estimator to estimate capacity of solar energy system is a non-limiting example of a use for the estimator. The estimator may be used to estimate capacity of any energy generator where capacity is flexible and can be estimated prior to installation. Each block of the flow diagrams below may represent a module of code to execute and/or combinations of hardware and/or software configured to perform one or more processes described herein. Though illustrated in a particular order, the following figures are not meant to be so limiting. Any number of blocks may proceed in any order (including being omitted) and/or substantially simultaneously (i.e. within technical tolerances of processors, etc.) to perform the operations described herein.

FIG. 3A depicts a method 300 that is performed when the server 204 of FIG. 2 executes the capacity estimator software 136. The method 300 begins at 302 and proceeds to 304 where a user, through the user device interacting with a web page, selects whether they desire to determine a capacity estimation for solar and storage 306, storage only 308 or solar only 310.

If the user selects solar and storage 306, the method 300 proceeds to 312 where the user is prompted to enter an indicium of a location where the system is to be installed (e.g., a zip code or address of the property upon which the solar energy and storage system is to be installed). At 314, the user enters an indicium of their facility size (e.g., in square feet or square meters). For residential users, the facility size is generally the home size. The facility size may be entered as a numerical value or graphically as a slider, knob or button. In one embodiment, the facility size is entered using a slider—e.g., as the slider is moved horizontally to the right, the size of the facility is increased. In addition to the location and size information, the method 300 may also accept additional information that can be used in modeling an energy generation and/or storage system including, but not limited to, load information, load backup information, family size, electrical panel information, etc.

At 316, using the location and the facility size (and any additional information supplied), the method 300 determines an estimate of the capacity of solar power and storage that should meet the needs of the user. The method 300 accesses the database to determine the amount of sunshine that should be available to the solar panels and estimates the amount of storage a typical user would require on cloudy days and overnight. The size of the facility is used to determine an average daily energy consumption value. Based on the amount of sunshine and the expected average daily energy consumption value, the method 300 determines a system model comprising the size of the solar array and the amount of storage to enable the residence to operate without any energy from the grid, i.e., an array sized to produce enough energy to power the facility during daylight hours as well as charge the storage for use overnight and on expected cloudy days. Additionally, the capacity estimation process may generate a bill of materials (BOM) listing the components of the modeled system, create financial estimates regarding purchase and installation of a system, optimize the energy generation system in view of the storage system or vice versa, create financial models regarding energy savings and payback rate and/or the like.

The system model may be improved using "real world" data gathered from operational systems in the field. This data may be aggregated across many systems to provide an accurate view of power generation that can provide an additional input into the model generation process.

At 318, the method 300 displays the requirements of the solar array and the energy storage as kilowatt hour values. In addition, the method 300 may also display a graphic of one or more of: a solar array, a numerical value of the number of solar panels needed to generate the required kilowatt hours, and/or an area (square feet or meters) needed for the required number of solar panels. The method 300 may also display an amount of daily energy consumption used in the capacity determination. In addition, the method 300 may display a graphic of one or more of: storage elements and/or a numerical value of the number of storage elements.

Based on the requirements, the method 300 may also generate information regarding the time required for the system to monetarily breakeven, e.g., a timeline, graph, or table of cash flow, as well as a percentage of energy independence that is expected from the system. Also, the method 300 may generate and display a consumption profile showing an expected power use over a selected period, e.g., day, month, year. Such a display may show the expected source of energy to be used at various times during the period, e.g., solar, storage or grid.

At 320, the user may adjust any of the parameters (input values and/or output values) used in the capacity determination at 316. For example, but not to be considered limiting of the invention, a user may adjust one or more, or any combination of: the amount of kilowatt hours generated by the solar array (i.e., make the solar array larger or smaller), the amount of kilowatt hours stored in the storage, add or delete specific loads, identify loads that are to be powered during a power outage from the grid and/or the amount of daily energy consumption, and/or the facility size. As such, if a user enters a specific facility size, but based on their electricity bill, knows the facility uses more or less power than initially estimated, the user can adjust the average daily power value using a graphical interface (e.g., entering a value or adjusting a knob, slider or button). In another example, a user may add additional, high consumption loads (e.g., appliances or electric automobiles) that will alter the amount of consumption. These loads may also be designated as requiring to be powered during a power outage. As such, an air conditioning unit or refrigerator may be so designated which increases the amount of storage needed. Once adjustments are made, the method 300 returns along path 324 to 316 to determine the system capacity requirements in view of the parameter adjustments (i.e., an initial estimate of system capacity is updated in view of the parameter adjustments) and then, at 318, displays the requirements and other information as described above. Specifically, in view of a change of a model parameter, the system model is updated and displayed. If no parameter adjustments were made, the method 300 ends at 322.

The method 300 may also identify loads that cannot be backed up using the current system model such that the user or the estimator may designate those loads for non-backup or the system parameters may be adjusted to enable the identified loads to be backed up. In view of the non-backed up load identification, the method 300 may recommend different system components that may resolve the back-up issue (e.g., different types/models of storage components, inverters, or solar panels may be recommended).

Additionally, the method 300 may adjust energy generation and/or storage capacity to optimize government rebates.

Commercial users will find benefit in using the estimator method 300 through entering their location indicium and adjusting the facility size to reflect the area to be covered with solar panels as well as adjusting the average daily energy consumption to match the business's current energy consumption. The resulting capacity estimate will be sufficient for the commercial needs of the user.

If at 309, the user selects storage only 308, the method 300 proceeds to the portion 326 of method 300 described with respect to FIG. 3B below. Alternatively, if at 309, the user selects solar only 310, the method 300 proceeds to the portion 328 of method 300 described with respect to FIG. 3C below.

FIG. 3B depicts a flow diagram of portion 326 of method 300 for determine a capacity estimate for storage only in accordance with at least one embodiment of the invention. Method portion 326 is entered at 330 where the user is prompted to enter the location (e.g., zip code or address) of the property upon which the storage system is to be installed. At 332, the user enters their facility size (e.g., in square feet or square meters). The facility size may be entered as a numerical value or graphically as a slider, knob or button. In one embodiment, the facility size is entered using a slider—e.g., as the slider is moved horizontally to the right, the size of the home is increased.

At 334, using the location and the facility size, the method 300 determines an estimate of the capacity of storage that should meet the needs of the user during a power outage. The method 300 accesses the database to estimate the amount of storage a typical user would require during a power outage, i.e., for the given location, the average duration of an outage is accessed. The size of the facility is used to determine an average daily energy consumption value. Based on the expected average daily energy consumption value and the expected duration of an outage, the method 300 determines the amount of storage to enable the facility to operate without any energy from the grid for the expected outage duration.

At 336, the method 300 displays the requirements of the energy storage as kilowatt hour values. In addition, the method 300 may also display a graphic of an amount of daily energy consumption used in the capacity determination as well as the duration of an outage. Also, the method 300 may display a graphic of one or more of: storage elements and/or a numerical value of the number of storage elements.

At 338, the user may adjust any of the parameters used in the capacity determination performed at 334. For example, but not to be considered limiting of the invention, a user may adjust one or more, or any combination of: the amount of kilowatt hours stored in the storage, add specific loads, identify loads that are to be powered during a power outage, the duration of an expected outage, the amount of daily energy consumption, and/or the facility size. As such, if the initial estimate indicates power generally last 3 hours, the user can adjust the power outage duration using a graphical interface (e.g., entering a value or adjusting a knob, slider or button) to increase or decrease the duration value. In another example, a user may add additional, high consumption loads (e.g., appliances or electric automobiles) and designate the loads as being required to be powered during a power outage. As such, an air conditioning unit or refrigerator may be so designated which increases the amount of required storage. Once adjustments are made, the method 300 returns along path 342 to determine the system capacity requirements in view of the adjustments. If no adjustments were made, the method 300 ends at 340.

FIG. 3C depicts a flow diagram of portion 328 of method 300 for determining a capacity estimate for solar energy generation only in accordance with at least one embodiment of the invention. Method portion 328 is entered at 344 where the user is prompted to enter the location of the property (e.g., zip code or address) upon which the solar system is to be installed. At 346, the user enters their facility size (e.g., in square feet or square meters). The facility size may be entered as a numerical value or graphically as a slider, knob or button. In one embodiment, the facility size is entered using a slider—e.g., as the slider is moved horizontally to the right, the size of the home is increased.

At 348, using the location and the facility size, the method 300 determines an estimate of the capacity of a solar array that should meet the needs of the user to power a facility of the designated size. The method 300 accesses the database to determine the average amount of sunshine available at the location and estimate the amount of energy consumed by a facility (e.g., home) of the designated size. Based on the expected average daily energy consumption value and amount of sunshine, the method 300 determines the size of the solar array (e.g., number of panels) necessary to enable the residence to operate during the day without any energy from the grid.

At 350, the method 300 displays the requirements of the energy generation as a kilowatt hour value and/or a number of solar panels necessary to produce the required energy level. In addition, the method 300 may also display a graphic of an amount of daily energy consumption used in the capacity.

At 352, the user may adjust any of the parameters used in the capacity determination performed at 348. For example, but not to be considered limiting of the invention, a user may adjust one or more, or any combination of: the amount of kilowatt hours generated by the array, add specific loads, the amount of daily energy consumption, and/or the facility size. As such, if the initial estimate indicates power generated will be 3.5 kW, the user can adjust the daily energy consumption using a graphical interface (e.g., entering a value or adjusting a knob, slider or button) to increase or decrease the consumption value. In response, the method 300 increases or decreases the solar array output by increasing or decreasing the number of panels. In another example, a user may add additional, high consumption loads (e.g., appliances or electric automobiles). As such, an air conditioning unit or refrigerator may be so designated which increases the amount of required energy production. Once adjustments are made, the method 300 returns along path 356 to determine the system capacity requirements in view of the adjustments. If no adjustments were made, the method 300 ends at 354.

FIGS. 4, 5, 6, and 7 depict exemplary web pages 400, 500, 600 and 700, respectively, that are used as a data input interface to the capacity estimator method 300 of FIGS. 3A, 3B, and 3C and used for information display of capacity requirements in accordance with an embodiment of the invention. The exemplary web pages in FIGS. 4 through 7 focus on homeowners as the users, as such, the indicium of location entry is a zip code and the indicium of facility size is a home size.

Figure 4:
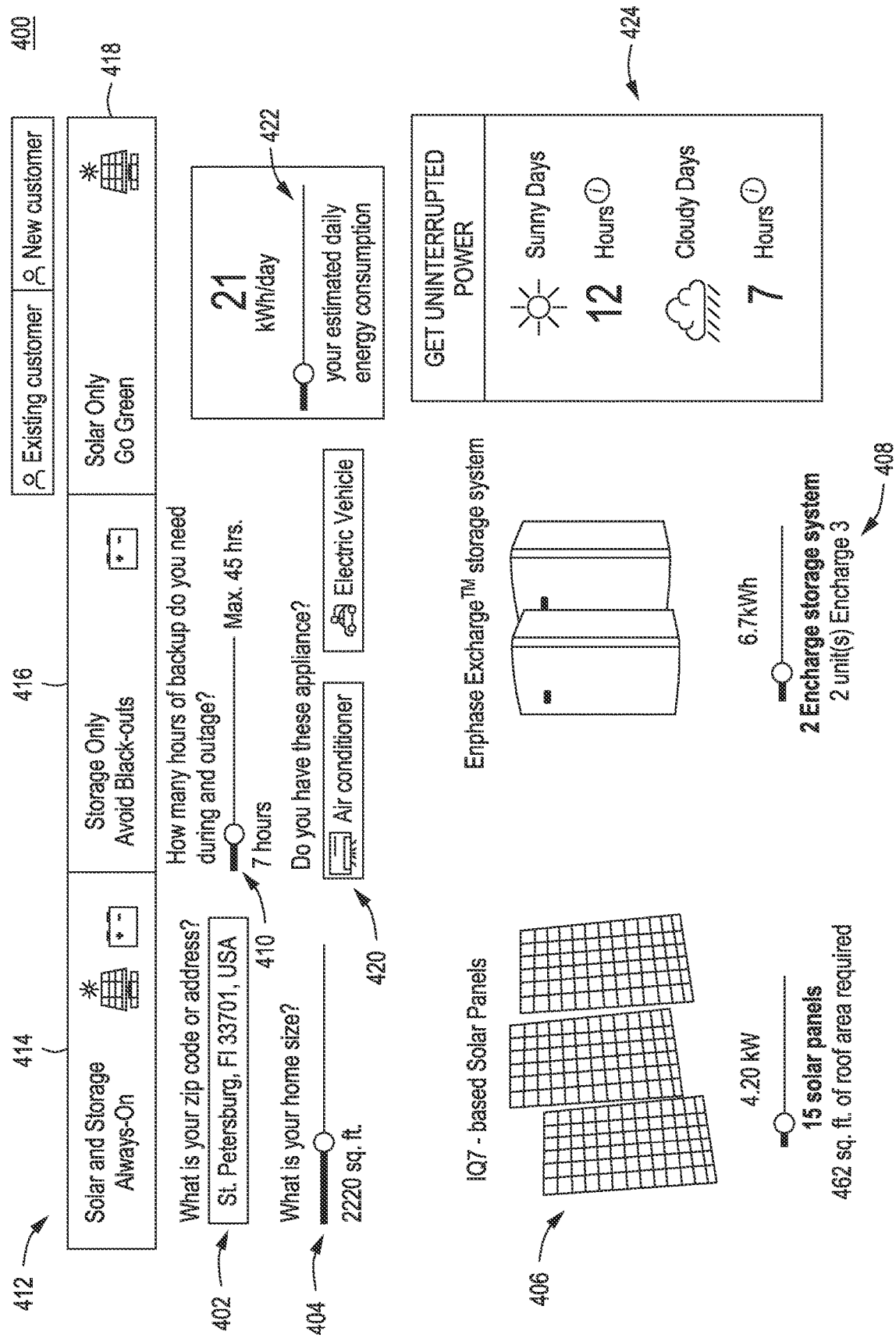
FIGS. 4, 5, 6, and 7 depict web pages used as a data input interface to the capacity estimator method of FIGS. 3A, 3B, and 3C and used for information display of capacity requirements in accordance with at least one embodiment of the invention.

FIG. 4 depicts an exemplary web page 400 that may be used when a user selects to determine the capacity of a solar generator and storage system (method 300 at 306 in FIG. 3A) in accordance with at least one embodiment of the invention. The web page 400 may comprise a function selection area 412 comprising three selectable regions: Solar and Storage 414, Storage Only 416 and Solar Only 418. Selecting regions 416 or 418 launches the web pages 500 (FIG. 5) or 600 (FIG. 6), respectively. The web page 400 further may comprise one or more of, or any combination of: a zip code field 402 for user entry of a facility location, a home size field 404 (in the depicted embodiment entered via a slider), a solar capacity display field 406, a storage capacity display field 408, a backup hours field 410, an appliances field 420 for adding specific appliances, a daily energy consumption area 422 and/or sunny/cloudy day indicator 424.

As described above, the user enters their zip code at 402 and selects the home size at 404 (using, for example, but not limited to, a horizontal slider). From the zip code, the hours of sun and clouds are predicted and displayed at indicator 424. Using the amount of sunshine for the zip code, the solar capacity is determined and displayed at field 406—depicting a graphic of solar panels, the number of panels needed, the estimated amount of energy to be produced and the roof area required for the number of panels. At field 408, the storage capacity is displayed that is commensurate with the amount of energy produced and an average back up time, e.g., 7 hours. The storage capacity is depicted, for example, but not limited to, an image of the storage products, the storage capacity, and the number and type of storage products to be used.

Both the solar capacity field 406 and the storage capacity field 408 contain an element enabling the capacity to be adjusted. For a non-limiting example, the capacity can be adjusted using a horizontal slider to add additional capacity of solar and/or storage. Other elements could be used to adjust the capacity such as a knob, button(s), numerical field or the like.

At field 410, the number of hours of backup may be adjusted in the same manner that capacity is adjusted, e.g., slider, numerical entry, knob, button(s) or the like. By increasing or decreasing backup time, the storage capacity is increased or decreased, respectively.

At field 420, additional loads (e.g., appliances, including vehicles) may be indicated. The example shows buttons to select air conditioner and/or electric vehicle. Additional and/or different loads may be depicted as selectable buttons or menus. The addition of these mandatory loads increases the amount of solar energy required and increases the amount of storage required to power these mandatory loads through a power outage.

At 422, a user may adjust the estimated amount of daily energy consumption. Initially, this value is estimated based on the size of the home; however, if the user knows, for example, from their electric bill, the amount of energy their home consumes, they can adjust the estimated amount up or down. A horizontal slider is depicted in the exemplary web page 400, but other adjustment elements or tools could be used, e.g., numerical entry, knob, button(s) or the like.

The web page 400 provides a comprehensive interface through which a user may quickly and efficiently estimate solar and storage capacity requirements, then make adjustments to fit their needs.

Figure 5:
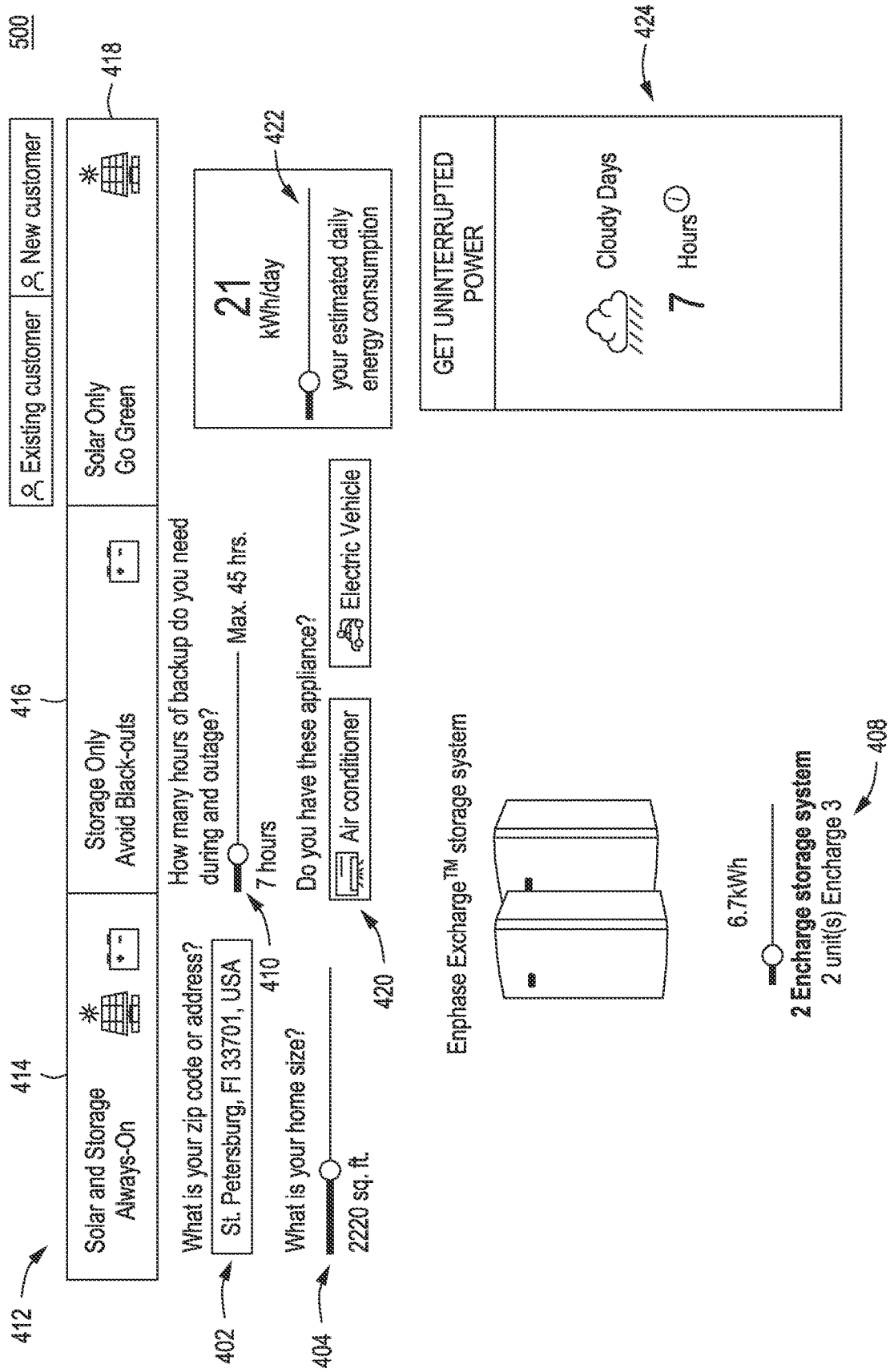

FIG. 5 depicts an exemplary web page 500 that may be used when a user selects to determine the capacity of a storage system (method 300 at 308 in FIG. 3A). The web page 500 is similar to the web page 400, except the solar related graphics are removed. As such, fields that are the same in FIG. 4 have the same reference numbers in FIG. 5. These regions, fields and/or elements function as described with respect to FIG. 4 to establish an estimated storage capacity and then facilitate user adjustments that effect the capacity.

Figure 6:
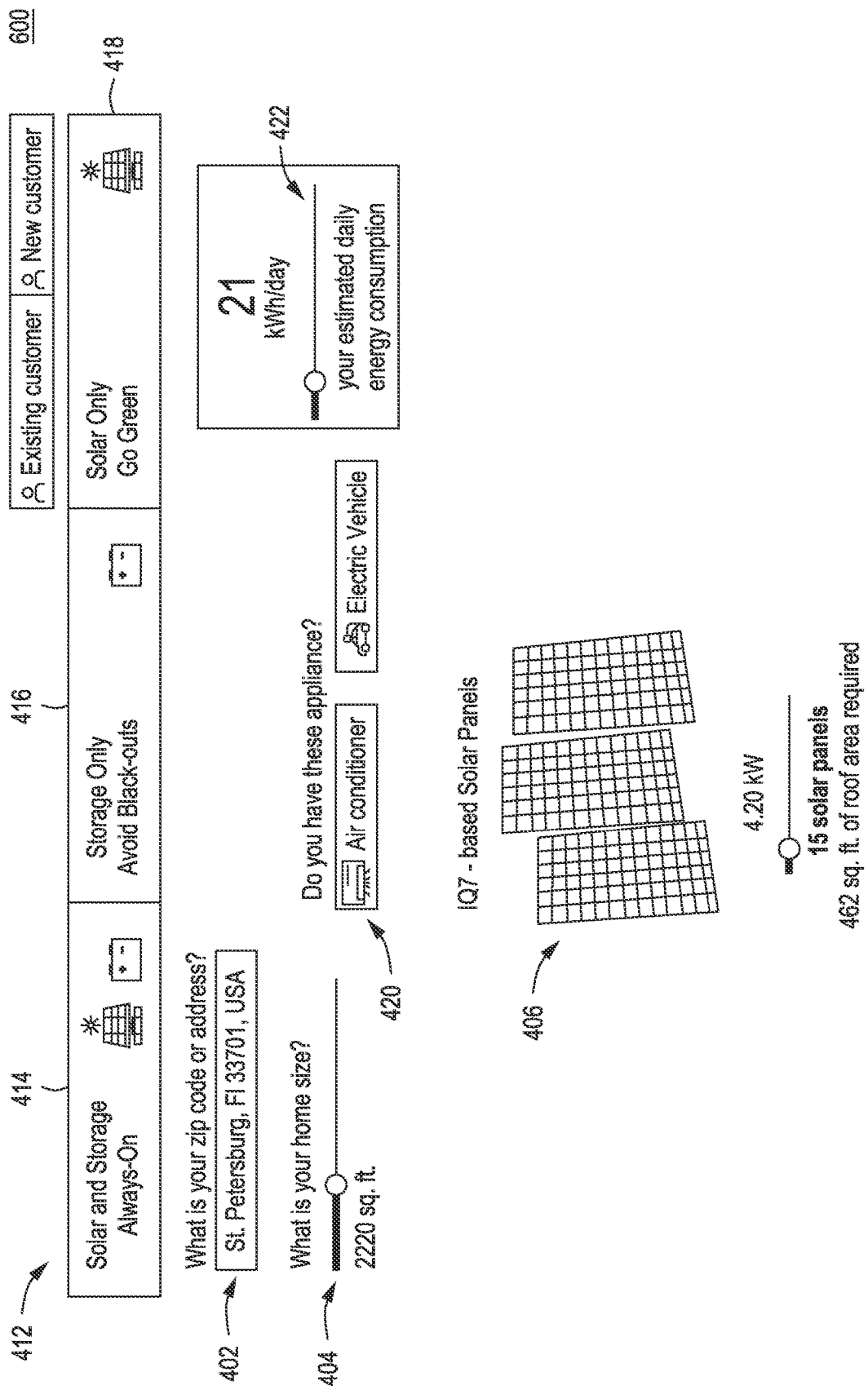

FIG. 6 depicts an exemplary web page 600 that may be used when a user selects to determine the capacity of a solar generator (method 300 at 310 in FIG. 3A). The web page 600 is similar to the web page 400, except the storage related graphics are removed. As such, fields that are the same in FIG. 4 have the same reference numbers in FIG. 6. These regions, fields and/or elements function as described with respect to FIG. 4 to establish an estimated solar generation capacity and then facilitate user adjustments that effect the capacity.

Figure 7:
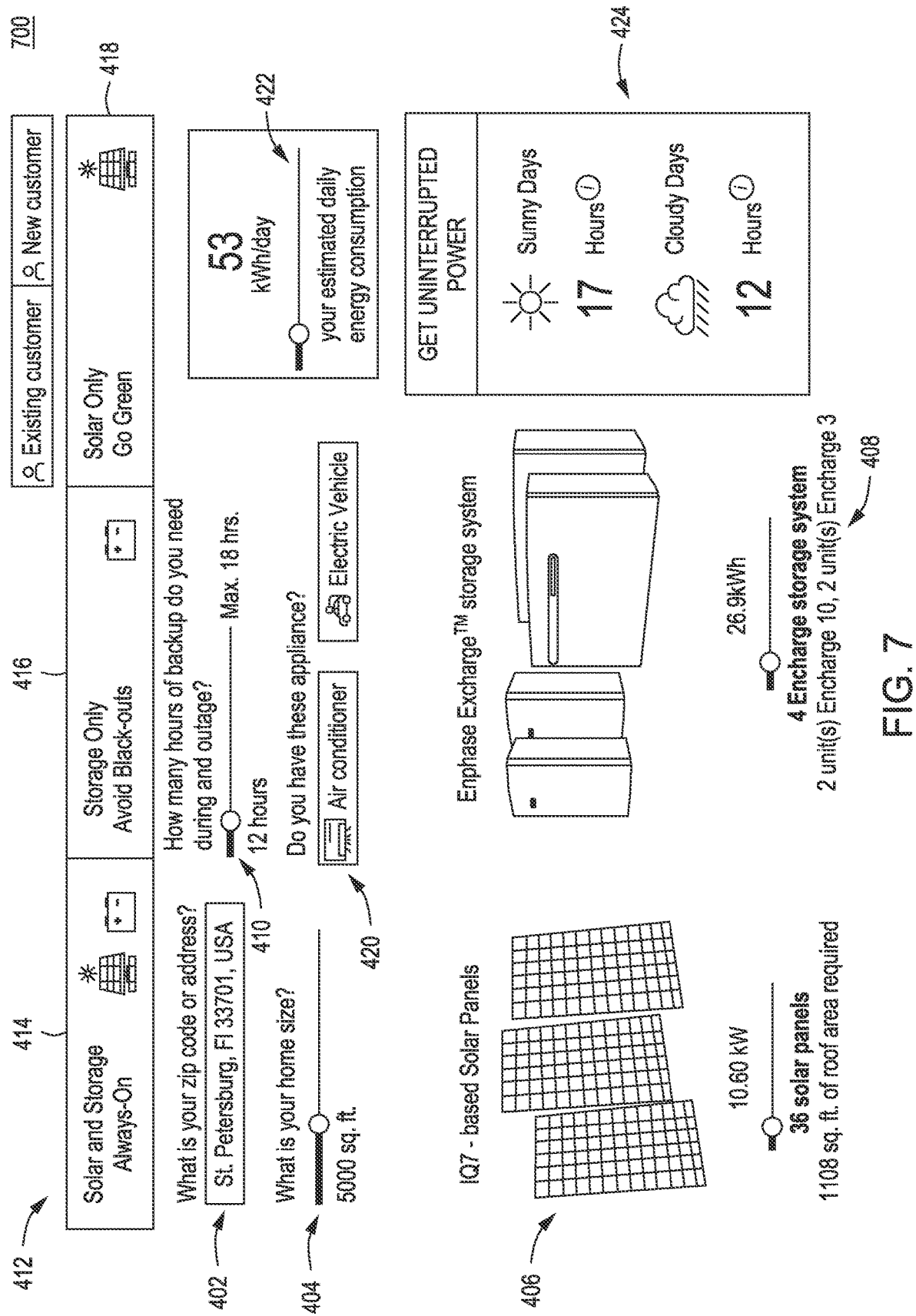

FIG. 7 depicts an exemplary web page 700 that may be used when a user selects to determine the capacity of a solar energy generation and storage system (method 300 at 306 in FIG. 3A). The web page 700 is similar to the web page 400, except home size (field 404) is substantially increased (e.g., 2220 sq. ft. to 5000 sq. ft.), the backup duration (field 410) is increased (e.g., from 7 hours to 12 hours), estimated daily energy consumption (field 422) is increased (e.g., from 21 kWh/day to 53 kWh/day), both loads (e.g., air conditioner and electric vehicle) are selected at field 420 and the loads are selected as "use during outage." Fields that are the same in FIG. 4 have the same reference numbers in FIG. 7. These regions, fields and/or elements function as described with respect to FIG. 7 to establish an estimated storage capacity and then facilitate user adjustments that effect the capacity. As can be seen in FIG. 7, the adjustments noted above have substantially increased the solar energy generation requirements (field 406) from 4.2 kW, 15 panels and 462 sq. ft. of roof area to 10.6 kW, 36 panels and 1108 sq. ft. of roof area. In addition, the storage capacity has increased from 6.7 kW and 2 storage units to 26.9 kW and 4 storage units (e.g., 2 small units and 2 large units of storage as shown in the graphic).

FIGS. 8, 9, 10, 11, 12, 13, 14, and 15 depict web pages used as a data input interface to the capacity estimator method of FIGS. 3A, 3B, and 3C and used for information display of capacity requirements in accordance with another embodiment of the invention. The web pages of this embodiment are sized for display on a user's hand-held mobile device. In this embodiment, a user inputs a location (the zip code or address) of the home for which they wish to estimate energy generation and/or energy storage capacity. From the location, the capacity estimator determines the average energy consumption and average home size for that location. Additionally, the cost per kilowatt hour (kWh) is accessed to facilitate estimation of the cost savings to the homeowner that will result by adding solar power generation to their home. The cost information (cents per kWh) may be downloaded, for example, as "Electric Power Monthly Data" from the US Energy Information Administration website.

From the baseline capacity estimate, the user may utilize advanced tools to adjust the home size, add or delete appliances, alter the backup configuration, and the like. Once complete, the user may review a capacity estimate for energy generation and/or storage and enter their contact information to be contacted by a local energy system installer.

Figure 8:
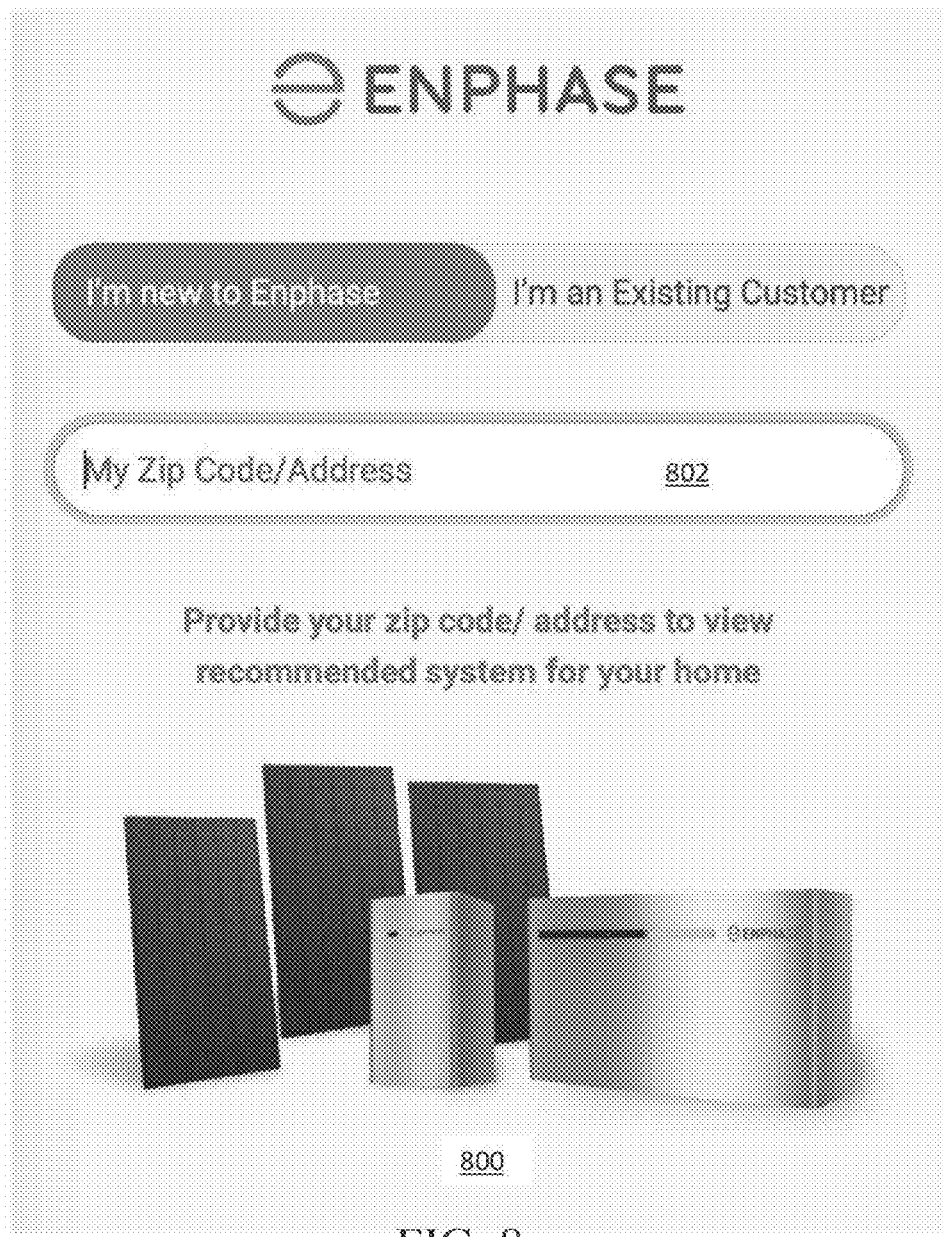
Figure 9:
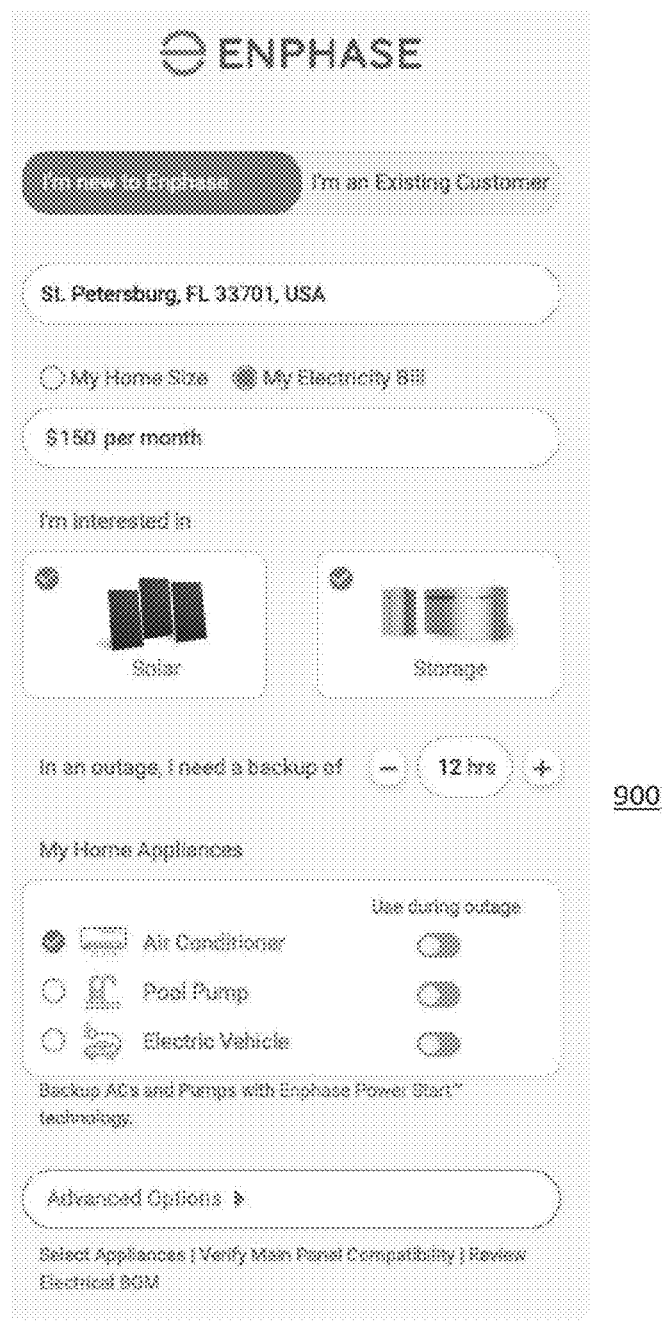
Figure 10:
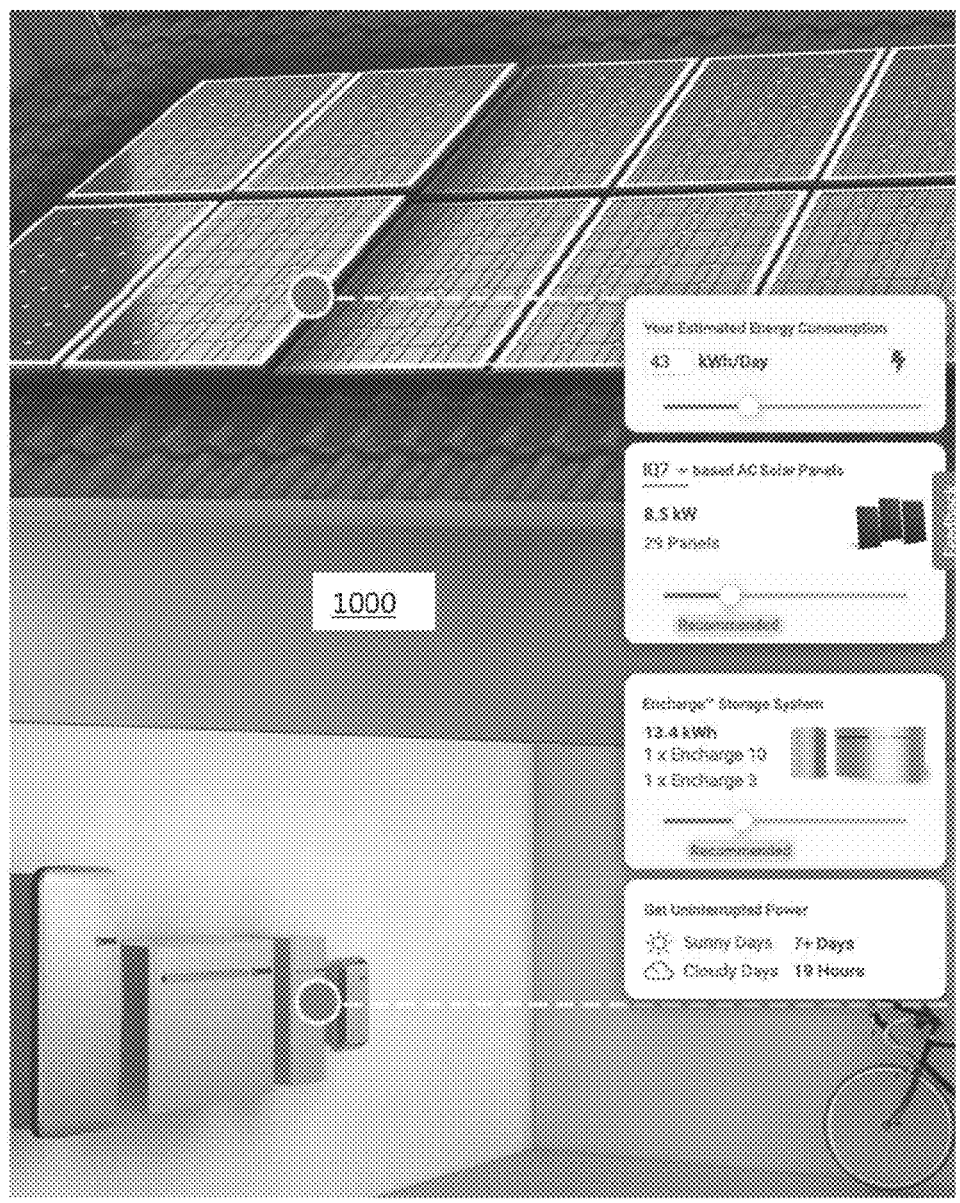

FIG. 8 depicts a webpage 800 through which a user may enter the location (zip code and/or address) of the home of interest in field 800. FIG. 9 depicts a web page 900 that is generated upon receipt of the location information. In one embodiment, the page 900 may indicates the location of the home, an estimated amount of the expected electricity bill for the location, an identification of the user's interest (i.e., energy generation (solar) and/or energy storage), duration of backup needed, and identification of main large appliances (loads). Additionally, the web page 900 may include a selection button to enter "advanced options." If the user knows the actual electricity bill amount, the field can be updated with an accurate value. Alternatively, an average home size (square footage) for the location may be used as the basis for the capacity estimation in lieu of the electricity bill value. The user may update the home size to a more accurate value, if desired. Also, the duration of backup and the appliances to be powered during a power outage may be selected.

In view of the values in web page 900, in one embodiment, web page 1000 appears adjacent to page 900 to indicate the capacity estimation of an energy generation system as well as a backup storage system. Sliders is available to adjust the amount of energy consumption, number of solar panels used to generate the electricity, amount of energy storage capacity. Additionally, the user may alter the model of microinverter used in the solar system. A solar energy generation system is considered an exemplary embodiment of use of the capacity estimator. In other embodiments, the capacity of other types of energy generators (e.g., wind turbines) may be estimated. In addition, the ability to select specific models of equipment may be extended to selecting not only a microinverter model, but also the solar panel model, the turbine model, the turbine blade model, and the like.

Figure 11:
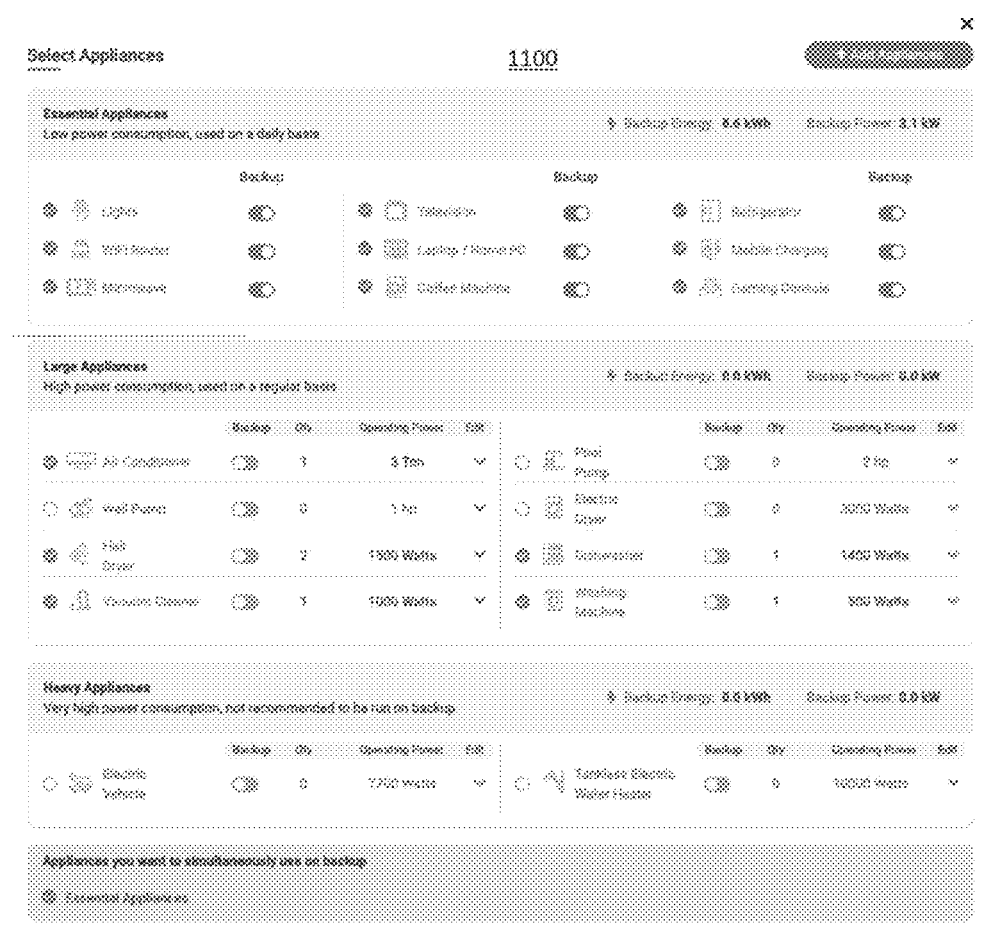

If the user selects the advanced option button in web page 900 of FIG. 9, the web page 1100 of FIG. 11 is displayed. In one embodiment, through manipulation of elements of the web page 1100, appliances (loads) may be selected and deselected for use in the calculation of energy generation requirements as well as energy storage requirements. Additional appliances may be added through selection of the "Add Appliances" button and entering an appliances' name and power consumption value. The quantity and operating power of the appliances may be edited to reflect actual values, if known. For convenience, the appliances are grouped as essential appliances (i.e., those required to be powered during a power outage), large appliances and heavy appliances. Generally, heavy appliances such as a tankless hot water heater or electric vehicle are not selected for backup, but the web page allows a user to select such appliances for back up, if desired. Such selection requires a very large capacity storage system.

Figure 12:
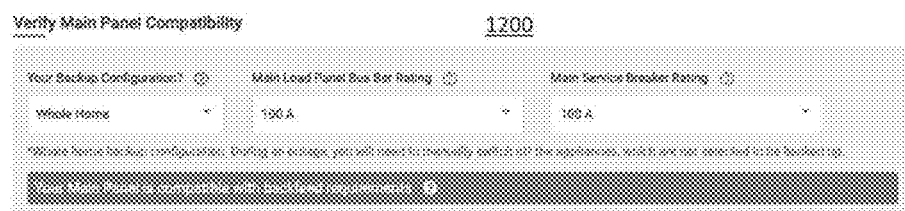

Another advanced option that may be manipulated is depicted as web page 1200 in FIG. 12, where a user may select whether the backup is required for the entire home or only a portion of the home. Additionally, the user may specify the main load bus bar rating in amperes and the main service breaker rating in amperes.

Figure 13:
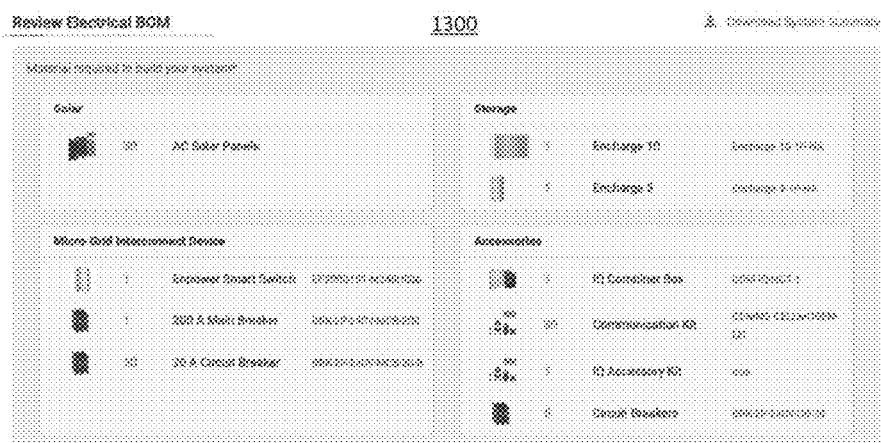

In view of the selections in the forgoing pages, FIG. 13 depicts web page 1300 defining the necessary equipment for an energy generation and/or energy storage system, i.e., a bill of materials (BOM) identifying the necessary equipment by model number and quantity, that is required to meet the estimated capacity.

Figure 14:
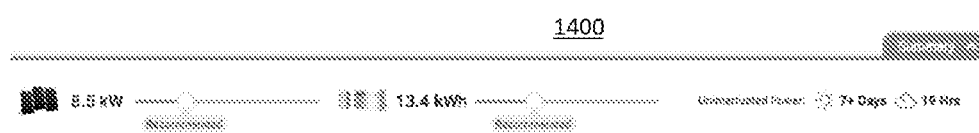
Figure 15:
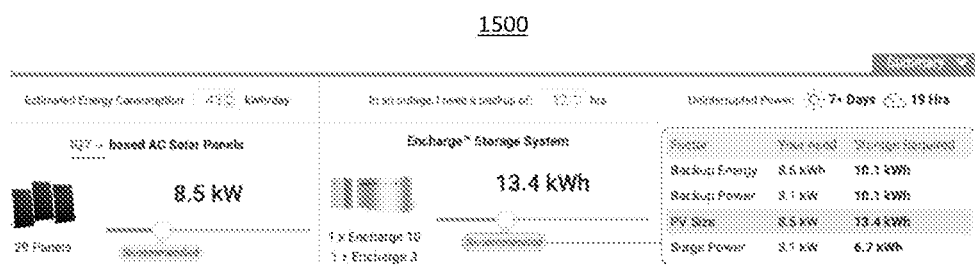

FIG. 14 is a portion of a web page 1400 depicting the capacity estimate based on the forgoing entries. When a user selects the "summary" tab, a more detailed summary page 1500 is displayed as shown in FIG. 15.

Figure 16:
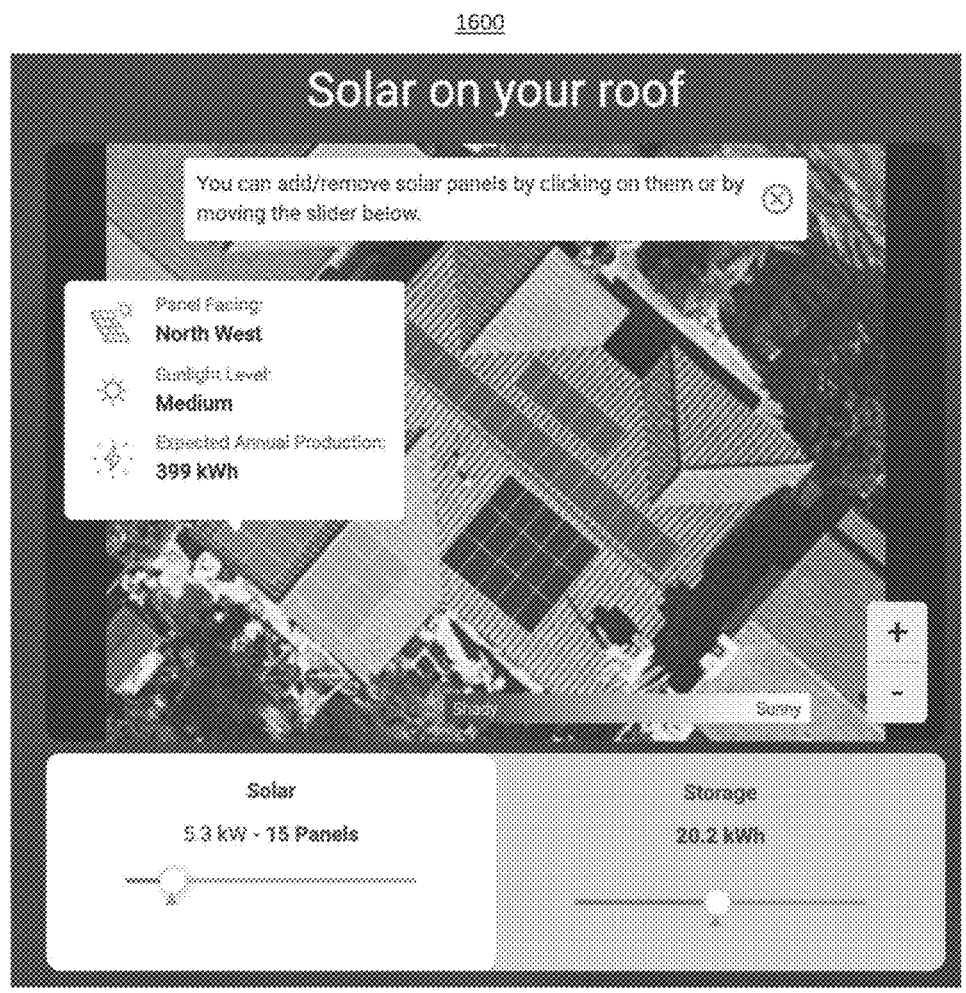

FIG. 16 depicts a web page 1600 depicting a rooftop at the entered location including animated solar panels positioned upon the roof. The user may manipulate, e.g., move, delete or add, panels. With each change, the amount of solar energy produced by the solar system will change. The user may also adjust a slider that will result in more or less solar panels to be positioned on the roof.

Figure 17:
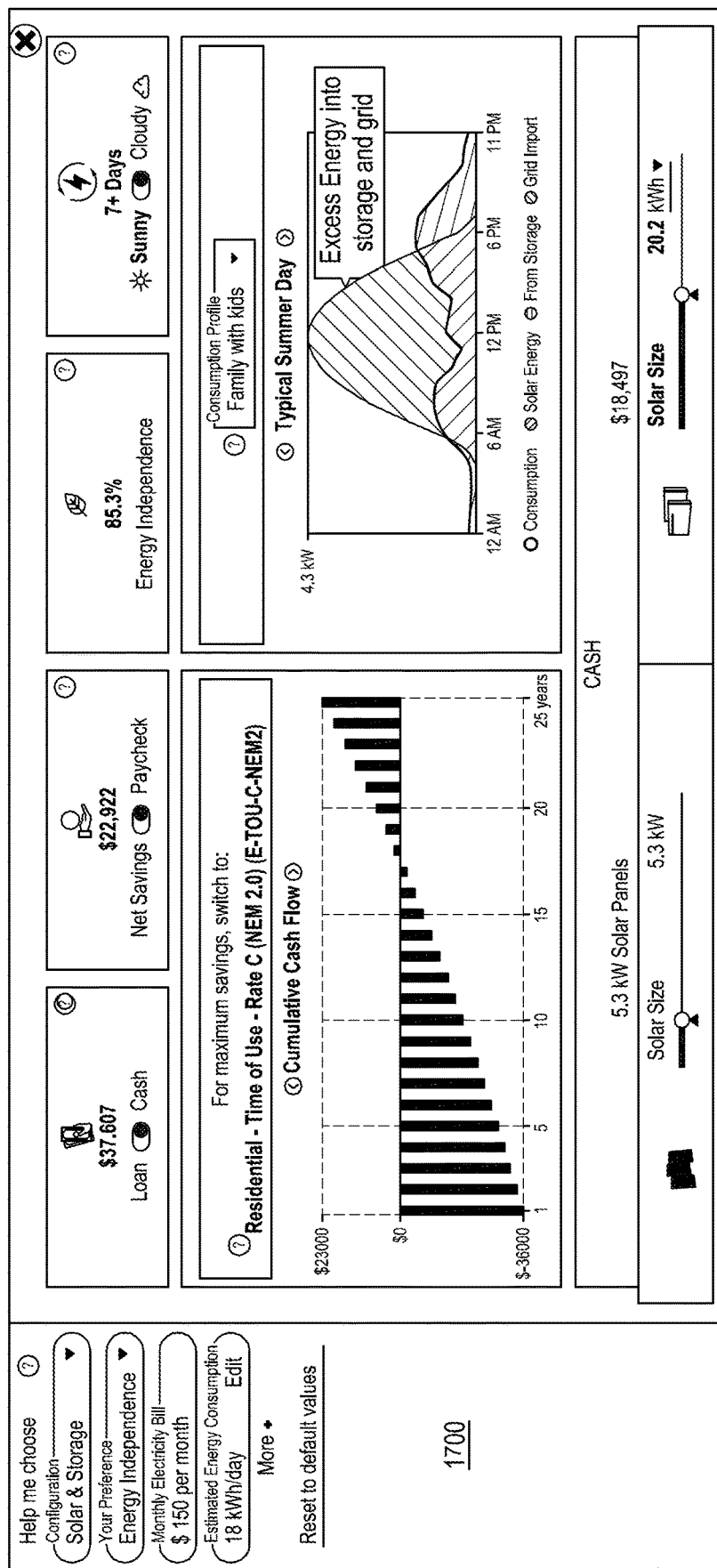

FIG. 17 depicts a web page 1700 depicting additional information that may be displayed including, but not limited to, system cost, electricity cost savings expected, percentage of energy independence, cumulative cash flow (time to breakeven), consumption profile and the like. Sliders may be manipulated to adjust solar system and/or storage system size while viewing the other displayed information. Thus, the impact of changing the system size on the financial aspects of owning a distributed generation/storage system.

Once all the system parameters are entered, capacity is estimated and a BOM is generated, the user may enter their contact information into a webpage or portion thereof to indicate the user desires to be contacted by an installer representative to discuss purchasing the equipment listed on the BOM.

Here multiple examples have been given to illustrate various features and are not intended to be so limiting. Any one or more of the features may not be limited to the particular examples presented herein, regardless of any order, combination, or connections described. In fact, it should be understood that any combination of the features and/or elements described by way of example above are contemplated, including any variation or modification which is not enumerated, but capable of achieving the same. Unless otherwise stated, any one or more of the features may be combined in any order.

As above, figures are presented herein for illustrative purposes and are not meant to impose any structural limitations, unless otherwise specified. Various modifications to any of the structures shown in the figures are contemplated to be within the scope of the invention presented herein. The invention is not intended to be limited to any scope of claim language.

Where "coupling" or "connection" is used, unless otherwise specified, no limitation is implied that the coupling or connection be restricted to a physical coupling or connection and, instead, should be read to include communicative couplings, including wireless transmissions and protocols.

Any block, step, module, or otherwise described herein may represent one or more instructions which can be stored on a non-transitory computer readable media as software and/or performed by hardware. Any such block, module, step, or otherwise can be performed by various software and/or hardware combinations in a manner which may be automated, including the use of specialized hardware designed to achieve such a purpose. As above, any number of blocks, steps, or modules may be performed in any order or not at all, including substantially simultaneously, i.e., within tolerances of the systems executing the block, step, or module.

Where conditional language is used, including, but not limited to, "can," "could," "may" or "might," it should be understood that the associated features or elements are not required. As such, where conditional language is used, the elements and/or features should be understood as being optionally present in at least some examples, and not necessarily conditioned upon anything, unless otherwise specified.

Where lists are enumerated in the alternative or conjunctive (e.g., one or more of A, B, and/or C), unless stated otherwise, it is understood to include one or more of each element, including any one or more combinations of any number of the enumerated elements (e.g. A, AB, AC, ABC, ABB, etc.). When "and/or" is used, it should be understood that the elements may be joined in the alternative or conjunctive.

While the foregoing is directed to embodiments of the present invention, other and further embodiments of the invention may be devised without departing from the basic scope thereof, and the scope thereof is determined by the claims that follow.

The invention claimed is:

1. Apparatus for estimating capacity of a system including an energy generation system, an energy storage system or both comprising:
one or more processors coupled to one or more non-transitory computer readable media storing instructions thereon which, when executed by the one or more processors, cause the one or more processors to perform operations comprising:
receiving indicium of a location of a facility for installation of the system;
receiving indicium of facility size of the facility;
determining an initial estimate of capacity of the system based, at least in part, upon the indicium of location and the indicium of facility size;
enabling a user to adjust at least one parameter comprising at least one of:
a facility size;
an amount of energy consumed by the facility;
a duration of a backup to be supplied by the energy storage system; or
an initial estimate of capacity of solar energy generation, capacity of energy storage, or both; and
determining an updated estimate of capacity of the system based, at least in part, upon the adjusted at least one parameter.

2. The apparatus of claim 1, wherein the receiving of indicium of facility size further comprises estimating the facility size based on the location.

3. The apparatus of claim 1, wherein enabling further comprises displaying at least one control element that is configured to be manipulated to adjust the at least one parameter.

4. The apparatus of claim 1, wherein the at least one parameter further comprises a plurality of loads that are to be powered by the energy storage system.

5. The apparatus of claim 4, further comprising a graphical switch to select or deselect each load in the plurality of loads that is to be powered by the energy storage system.

6. The apparatus of claim 1, further comprising generating and displaying a bill of materials based upon the updated estimate of capacity.

7. The apparatus of claim 1, further comprising generating and displaying a list of components for the system based upon the updated estimate of capacity.

8. A method for estimating capacity of a system including an energy generation system, an energy storage system or both comprising:
receiving indicium of a location of a facility for installation of the system;
receiving indicium of facility size;
determining an initial estimate of capacity of the system based, at least in part, upon the indicium of location and the indicium of facility size;
enabling a user to adjust at least one parameter comprising at least one of a facility size;
an amount of energy consumed by a facility to be powered by the system;
a duration of a backup to be supplied by the energy storage system; or
an initial estimate of capacity of solar energy generation, capacity of energy storage, or both; and
determining an updated estimate of capacity of the system based, at least in part, upon the adjusted at least one parameter.

9. The method of claim 8, wherein enabling further comprises displaying at least one control element that is configured to be manipulated to adjust the at least one parameter.

10. The method of claim 8, wherein the at least one parameter further comprises a plurality of loads that are to be powered by the energy storage system.

11. The method of claim 10, further comprising providing a graphical switch to select or deselect each load in the plurality of loads that is to be powered by the energy storage system.

12. The method of claim 8, further comprising generating and displaying a bill of materials based upon the updated estimate of capacity.

13. The method of claim 8, further comprising generating and displaying a list of components for the system based upon the updated estimate of capacity.

14. One or more non-transitory computer readable media storing instructions that, when executed by one or more processors, cause the one or more processors to perform operations for estimating capacity of a system including an energy generation system, an energy storage system or both, the operations comprising:
receiving indicium of a location of a facility for installation of the system;
receiving indicium of facility size;
determining an initial estimate of capacity of the system based, at least in part, upon the indicium of location and the indicium of facility size;
enabling a user to adjust at least one parameter comprising at least one of:
a facility size;
an amount of energy consumed by a facility to be powered by the system;
a duration of a backup to be supplied by the energy storage system; or
an initial estimate of capacity of solar energy generation, capacity of energy storage, or both; and
determining an updated estimate of capacity of the system based, at least in part, upon the adjusted at least one parameter.

15. The one or more non-transitory computer readable media of claim 14, wherein the operation of enabling further comprises displaying at least one control element that is configured to be manipulated to adjust the at least one parameter.

16. The one or more non-transitory computer readable media of claim 14, wherein the at least one parameter further comprises a plurality of loads that are to be powered by the energy storage system.

17. The one or more non-transitory computer readable media of claim 16, wherein the operations further comprise providing a graphical switch to select or deselect each load in the plurality of loads that is to be powered by the energy storage system.

18. The one or more non-transitory computer readable media of claim 14, wherein the operations further comprise generating and displaying a bill of materials based upon the updated estimate of capacity.

19. The one or more non-transitory computer readable media of claim 14, wherein the operations further comprise generating and displaying a list of components for the system based upon the updated estimate of capacity.

* * * * *